United States Patent
Ams et al.

(10) Patent No.: US 8,814,135 B2
(45) Date of Patent: Aug. 26, 2014

(54) DEVICE FOR CONTROLLING THE FLOW OF A LIQUID OR GASEOUS MEDIUM

(75) Inventors: Felix Ams, Kaempfelbach (DE); Martin Vogt, Oelbronn (DE)

(73) Assignee: Asco Numatics GmbH, Oelbronn-Duerrn (DE)

( * ) Notice: Subject to any disclaimer, the term of this patent is extended or adjusted under 35 U.S.C. 154(b) by 229 days.

(21) Appl. No.: 12/868,941

(22) Filed: Aug. 26, 2010

(65) Prior Publication Data

US 2011/0315907 A1 Dec. 29, 2011

(30) Foreign Application Priority Data

Jun. 23, 2010 (EP) .................................... 10006531

(51) Int. Cl.
- *F16K 31/02* (2006.01)
- *F16K 25/00* (2006.01)
- *F16F 9/30* (2006.01)
- *H01F 7/08* (2006.01)
- *F16K 31/06* (2006.01)

(52) U.S. Cl.
CPC .......... *F16K 31/0655* (2013.01); *F16K 31/0686* (2013.01)
USPC ...... 251/129.15; 251/64; 335/277; 188/322.5

(58) Field of Classification Search
USPC ............... 188/322.5, 380; 239/585.4; 251/64, 251/129.15, 176; 267/161; 335/257, 271, 335/277
See application file for complete search history.

(56) References Cited

U.S. PATENT DOCUMENTS

| | | | | |
|---|---|---|---|---|
| 4,032,270 A * | 6/1977 | Sheth et al. | .................... | 267/152 |
| 4,759,428 A * | 7/1988 | Seshimo | ....................... | 188/312 |
| 5,046,530 A | 9/1991 | Gossner et al. | | |
| 5,157,825 A * | 10/1992 | Kasahara | ..................... | 29/896.9 |
| 5,232,196 A * | 8/1993 | Hutchings et al. | ........ | 251/129.08 |
| 5,758,864 A | 6/1998 | Asai | | |
| 6,032,925 A * | 3/2000 | Izuo et al. | ................ | 251/129.17 |
| 6,585,002 B2 * | 7/2003 | Stafford | ........................ | 137/539 |
| 7,147,202 B2 * | 12/2006 | Schulz et al. | .................... | 251/64 |
| 8,327,876 B2 * | 12/2012 | Koyomogi | .................... | 137/505 |

FOREIGN PATENT DOCUMENTS

| | | | | |
|---|---|---|---|---|
| DE | 1 169 242 | 4/1964 | | |
| EP | 0 380 754 | 8/1990 | | |
| EP | 1 388 698 | 2/2004 | | |
| EP | 1 536 169 | 6/2005 | | |
| EP | 1536169 A1 * | 6/2005 | ............. | F16K 31/06 |
| WO | 2004/109089 | 12/2004 | | |
| WO | 2005/108840 | 11/2005 | | |

* cited by examiner

*Primary Examiner* — John Rivell
*Assistant Examiner* — Seth W Mackay-Smith
(74) *Attorney, Agent, or Firm* — Michael J. Striker

(57) ABSTRACT

A device for controlling the flow of a liquid or gaseous medium, has at least one flow opening for the medium, and a movable valve element for controlling the flow opening. At least one damping body, which is preferably viscoelastic and acts on the valve element, is provided for obtaining a large dynamic range of the device in order to control flow in a fine, precise, and oscillation-free manner across a broad range of flow volume.

10 Claims, 1 Drawing Sheet

DEVICE FOR CONTROLLING THE FLOW OF A LIQUID OR GASEOUS MEDIUM

CROSS-REFERENCE TO RELATED APPLICATION

The invention described and claimed hereinbelow is also described in European Patent Application EP 10 006 531.7 filed on Jul. 23, 2010. This European Patent Application, whose subject matter is incorporated here by reference, provides the basis for a claim of priority of invention under 35 U.S.C. 119(a)-(d).

BACKGROUND OF THE INVENTION

The invention relates to a device for controlling the flow of a liquid or gaseous medium.

A known device for controlling the flow of a liquid or gaseous medium (EP 1 536 169 A1) includes a 2/2 directional control valve having a valve element that controls a valve opening through which the medium can flow, and an electromagnet that actuates the valve element. The valve element is disposed in a valve chamber formed in a valve housing; the valve opening, which is situated between a valve inlet and a valve outlet, is formed in the valve chamber. The valve opening is enclosed by a valve seat with which the valve element interacts to close and open the valve opening. The electromagnet includes a magnetic circuit having a solenoid coil or excitation coil, an armature sleeve that accommodates the solenoid coil on the outside and is closed by an armature plug, and a solenoid armature that is guided in the interior of the armature sleeve.

The solenoid armature is held, in an axially displaceable manner, in the armature sleeve using two flat springs disposed on the upper and lower end faces; together with the armature plug, the solenoid armature limits a working air gap contained in the magnetic circuit. The armature sleeve protrudes into the valve chamber. The point of entry is sealed against the valve housing by a sealing ring. The valve element includes a sealing holder having a plug, which is inserted axially into the solenoid armature, and a sealing plate that is accommodated in the sealing holder and interacts with the valve seat. The closed state of the valve is brought about by a valve closing spring that acts on the solenoid armature; the valve closing spring is disposed in a blind hole in the solenoid armature, bears against the armature plug, and presses the sealing plate against the valve seat.

When current is supplied to the electromagnet, the solenoid armature is displaced axially against the spring force of the valve closing spring, and the solenoid armature lifts the valve element off of the valve seat, thereby opening the valve opening and, depending on the lift of the valve element, a larger or smaller volume of medium flows from the valve inlet via the valve chamber to the valve outlet. The valve chamber is filled continually with medium, and so the medium constantly flows around the valve element and the end face of the solenoid armature.

SUMMARY OF THE INVENTION

The problem addressed by the invention is that of providing a device for controlling the flow of a liquid or gaseous medium, that has a large dynamic range and therefore makes it possible to control the flow of extremely different flow volumes of the medium in a fine, precise, and oscillation-free manner.

In keeping with these objects and with others which shall become apparent hereinafter, one feature of the present invention resides, briefly stated in a device for controlling a flow of a medium selected from the group consisting of a liquid medium and a gaseous medium, comprising at least one flow opening for the medium; a movable valve element for controlling said flow opening; and at least one damping body acting on said valve element.

The device according to the invention has the advantage that, due to the at least one damping body that is preferably viscoelastic, acts on the movable valve element, and is composed e.g. of a gel-type material, the valve element is damped in a speed-dependent, "dynamic" manner as it moves in a reciprocating manner, thereby preventing the flow from fluctuating.

Smaller changes in flow are implemented with little delay. When flow volumes are greater, oscillations of the valve element during flow control are prevented. The attainable dynamic range is greater than 1:2000. Gel damping prevents the transition from stiction to kinetic friction i.e. "stick slip". In contrast to friction damping, gel damping does not result in greater hysteresis. Examples of the gel-type material that is advantageously used for the damping body are e.g. polyurethane gel and silicone gel. Other damping means or other damping material can also be used for the damping body.

According to an advantageous embodiment of the invention, the movable valve element includes a sealing element that interacts with a valve seat that encloses the at least one flow opening, and includes a solenoid armature—which is fixedly connected to a sealing element—of an electromagnet and a bearing element that is fixedly connected to the solenoid armature and/or sealing element in order to support the valve element with minimal friction. The at least one damping body that acts on the valve element can act directly or indirectly on one of the movable valve element parts e.g. on the solenoid armature and/or on the sealing element and/or on its bearing element. As a result, a large number of possibilities exist for integrating the at least one damping body in a structurally appropriate manner, with consideration for structural conditions inside the device. The damping body is disposed such that it is exposed to compression pressure when the sealing element lifts off of the valve seat.

According to an advantageous embodiment of the invention, the valve element extends into a valve chamber formed in a valve housing; a flow opening and valve seat are formed in the valve chamber. The damping body can be disposed in the valve chamber and can bear e.g. against the chamber wall.

According to an advantageous embodiment of the invention, the bearing element is formed by a flat spring that is situated in the valve chamber. The flat spring is secured in the valve housing on the edge, while the sealing element and solenoid armature are fastened in the center on the flat spring. In this case, it can be advantageous in terms of design that the at least one damping body acts e.g. on the flat spring and bears against the flat spring on one side and, on the other side, against the wall of the valve chamber opposite the flat spring. To optimize the damping, a plurality of damping bodies, which are disposed e.g. at identical circumferential angles relative to each other, can be situated in the valve chamber in the manner described.

According to an advantageous embodiment of the invention, the flat spring is preloaded toward the valve seat and, together with an adjustment spring that acts on the solenoid armature, influences the closing force of the valve element.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
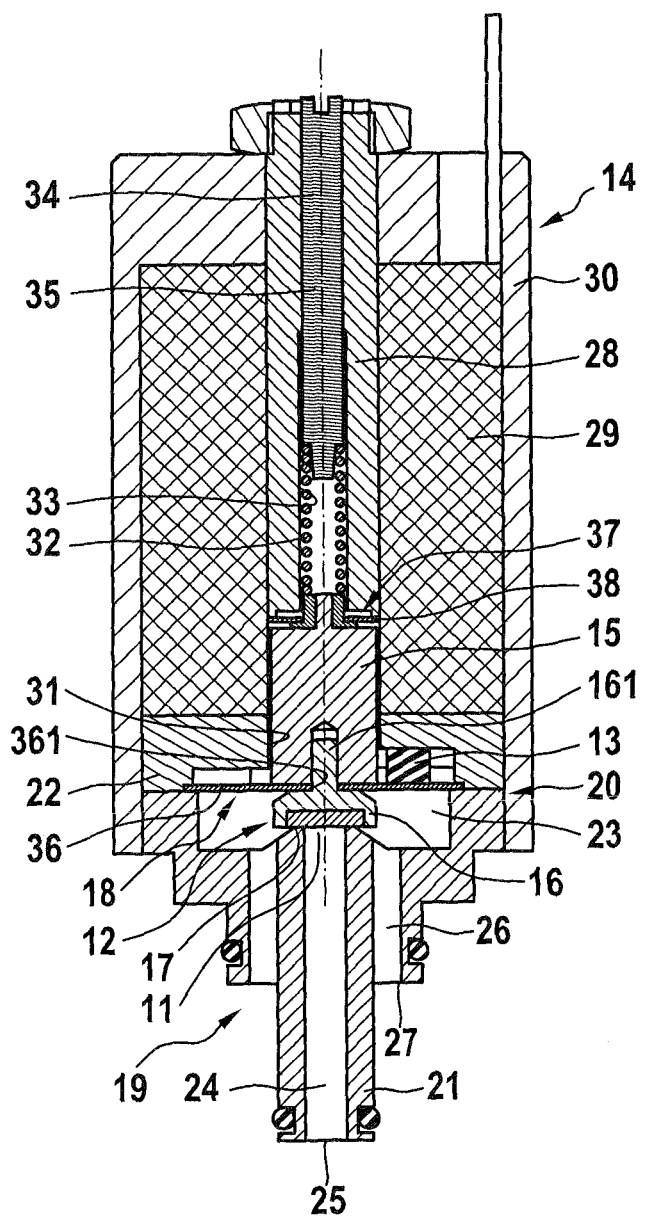
FIG. 1 a longitudinal sectional view of a device for controlling the flow of a liquid or gaseous medium according to the present invention, FIG. 2 a top view of a flat spring, on which damping bodies are placed, in the device according to the present invention shown in FIG. 1.

The device, which is shown as an example in a longitudinal sectional view in FIG. 1, for controlling the flow of a liquid or gaseous medium which is also referred to as a fluid, flowing, or streaming medium, includes at least one flow opening 11 for the medium, and a movable valve element 12 for controlling flow opening 11, wherein preferably at least one viscoelastic damping body 13 acts on valve element 12 to control the flow of the medium through flow opening 11 in a fine, precise manner despite very different flow volumes.

Valve element 12, which is actuated by an electromagnet 14, includes a solenoid armature 15 of electromagnet 14, a sealing element 16 which interacts with a valve seat 17 that encloses flow opening 11 to control flow opening 11, and a bearing element 18 for supporting valve element 12 in a low-friction or largely frictionless manner, wherein solenoid armature 15, sealing element 16, and bearing element 18 are movable parts that are securely interconnected, and the at least one damping body 13 acts on one of these valve element parts. Damping body 13 is disposed such that it is exposed to compression pressure when sealing element 16 lifts off of valve seat 17. Damping body 13 is composed e.g. of a gel-type material, wherein e.g. polyurethane gel or silicone gel can be used.

Structurally, the device is composed of a valve 19 and electromagnet 14 which actuates valve 19. In the embodiment depicted in FIG. 1, valve 19 is designed as a 2/2 directional control valve, although it can also be designed e.g. as a 3/2 directional control valve. Valve 19 includes a two-pieced valve housing 20 that is composed of a valve body 21 and a valve cover 22 that closes valve body 21. A valve chamber 23 is provided in valve housing 20, the chamber walls of which are formed by valve body 21 and valve cover 22. Valve seat 17, which encloses flow opening 11, is formed on valve body 21 in valve chamber 23. Valve chamber 23 is connected via a first channel 24, which extends toward flow opening 11, to a first valve connection 25, and is connected via a second channel 26 to a second valve connection 27. Channels 24, 26 are formed in valve body 21.

Electromagnet 14 includes solenoid armature 15 and a magnetic core 28, which is situated coaxially to solenoid armature 15, a solenoid coil 29 that is slid onto magnetic core 28, and a pot-type magnet housing 30 that accommodates magnetic core 28 and solenoid coil 29. Magnet housing 30, which partially extends over valve body 21, securely encloses valve cover 22 and incorporates it, as a magnetic yoke, in the magnetic circuit of electromagnet 14. Solenoid armature 15 extends through a central opening 31 in valve cover 22. A valve closing spring 32 that is disposed in a central axial bore 33 in magnetic core 28 acts on the end face of solenoid armature 15 facing away from sealing element 16. The pre-load of valve closing spring 32 and, therefore, the closing force of valve element 12 is adjusted using an adjusting screw 35 that can be screwed in a threaded section 34 of axial bore 33.

Figure 2:
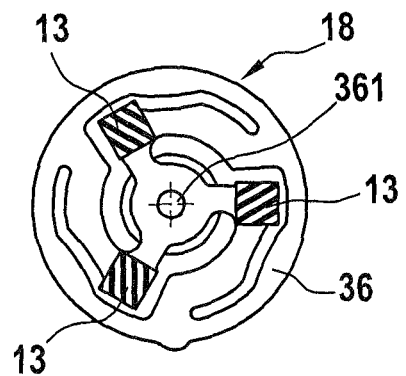

In the embodiment shown, bearing element 18 of valve element 12 is designed as a flat spring 36 which is disposed in valve chamber 23 and is secured in valve housing 20 on the edge that extends between valve body 21 and valve cover 22, and which is securely connected in the center to sealing element 16 and solenoid armature 15. Sealing element 16 is disposed on the end face of solenoid armature 15 and is pressed into solenoid armature 15 e.g. using a plug 161, wherein plug 161 is inserted through a central hole 361 in flat spring 36, thereby fixedly clamping flat spring 36 between sealing element 16 and solenoid armature 15. Flat spring 36, which is shown in FIG. 1 in its clamped position in valve housing 20, is depicted in FIG. 2 in a top view together with a plurality of damping bodies 13 installed thereon, wherein damping bodies 13 are shaded to enhance their visibility.

Damping bodies 13, which are preferably gel-like, are disposed in valve chamber 23 such that they are offset relative to each other in the circumferential direction. They bear against flat spring 36 on one side and, on the other side, against valve cover 22 which forms one of the walls of valve chamber 23, whereby they are fastened to valve cover 22, preferably being bonded thereto. Three such damping bodies 13, which are offset from each other by 120°, are present in the embodiment shown, as depicted in FIG. 2. Advantageously, flat spring 36 is preloaded toward valve seat 17 and contributes to the closing force of valve element 12.

To ensure that solenoid armature 15 is contactlessly displaceable in central opening 31 in valve cover 22, a further bearing element 37 for valve element 12 is provided on the side of solenoid armature 15 facing away from bearing point 18. Further bearing element 37 is a flat spring 38 which is disposed between solenoid armature 15 and magnetic core 28, and which bears against the end face of solenoid armature 12 on one side and, on the other side, against the end face of magnetic core 28. Further flat spring 38 has the same shape as flat spring 36 of bearing element, which is depicted in FIG. 2, although with a smaller outer diameter. Damping bodies 13 that are placed on flat spring 36, as shown in FIG. 2, are not included, of course.

It will be understood that each of the elements described above, or two or more together, may also find a useful application in other types of constructions differing from the types described above.

While the invention has been illustrated and described as embodied in a device for controlling the flow of a liquid or gaseous medium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A device for controlling a flow of a medium selected from the group consisting of a liquid medium and a gaseous medium, comprising:
   at least one flow opening for the medium;
   a movable valve element for controlling said flow opening, said valve element including a movable solenoid armature of an electromagnet, a sealing element secured to said solenoid armature and interacting with a valve seat that encloses said at least one flow opening;

a bearing element securely connected to a component selected from the group consisting of said sealing element, said solenoid armature, and both said sealing element and said solenoid armature, said bearing element supporting said valve element;

at least one damping body acting on a part of said valve element, wherein said part is selected from the group consisting of said armature, said sealing element, and said bearing element, wherein said damping body is a viscoelastic body composed of gel-type material and is disposed such that it is exposed to compression pressure when said sealing element lifts off of said valve seat; and a valve housing in which said flow opening and said valve seat are formed, the valve housing including a valve chamber, wherein the valve element protrudes into said valve chamber and said at least one damping body bears against a wall of said valve chamber, wherein said bearing element is a flat spring disposed in said valve chamber, secured in said valve housing on an edge and fixedly connected in a center between said sealing element and said solenoid armature by clamping, wherein a plurality of said damping bodies are provided and offset relative to one another by a same circumferential angle, and thereby bear against said flat spring and against a valve cover that forms one of the walls of said valve chamber, whereby said plurality of damping bodies are arranged between said bearing element and said valve cover.

2. The device as defined in claim 1, wherein said at least one damping body is composed of the gel-type material selected from the group consisting of polyurethane gel and material containing polyurethane gel.

3. The device as defined in claim 1, wherein said at least one damping body is composed of a material selected from the group consisting of silicone gel and containing silicone gel.

4. The device as defined in claim 1, wherein said valve housing is composed of two pieces, including a valve body in which said valve chamber and channels leading into said valve chamber are provided, and a valve cover that closes said valve chamber, wherein said edge of said flat spring is clamped between said valve body and said valve cover.

5. The device as defined in claim 4, wherein said damping body is fastened to said valve cover.

6. The device as defined in claim 1, wherein said damping body is fastened to said valve cover.

7. The device as defined in claim 1, wherein said flat spring is preloaded toward said valve seat.

8. The device as defined in claim 1, further comprising a further bearing element for said valve element and disposed on a side of said solenoid armature facing away from said first mentioned bearing element.

9. The device as defined in claim 8, wherein said further bearing element is a flat spring which is disposed between said solenoid armature and a magnetic core of an electromagnet, wherein said magnetic core is situated coaxially to said solenoid armature, while said further bearing element bears against end faces of said solenoid armature and said magnetic core.

10. The device as defined in claim 9, further comprising a valve closing spring which loads said valve element in a direction toward said valve seat and has a preload which is adjustable by an adjusting screw that acts on said valve closing spring, wherein said valve closing spring and said adjusting screw are accommodated in an axial bore of said magnetic core.

* * * * *